United States Patent [19]

Lewins et al.

[11] Patent Number: 5,278,644
[45] Date of Patent: Jan. 11, 1994

[54] PSEUDO CROSS-COUPLE FOR NON-LINEAR DETECTORS

[75] Inventors: Lloyd L. Lewins, Marina Del Rey; Roland L. Andrews, Altadena; George M. Buritica, Cerritos, all of Calif.

[73] Assignee: Hughes Aircraft Company, Los Angeles, Calif.

[21] Appl. No.: 830,090

[22] Filed: Feb. 3, 1992

[51] Int. Cl.5 .......................... H04N 5/16; H04N 5/33
[52] U.S. Cl. ..................................... 358/113; 358/171
[58] Field of Search ................. 358/113, 34, 166, 172, 358/171; H04N 5/16, 5/33

[56] References Cited

U.S. PATENT DOCUMENTS

| 4,214,271 | 7/1980 | Jones et al. | 358/171 |
| 4,400,729 | 8/1983 | Jones | 358/171 |
| 4,963,963 | 10/1990 | Dorman | 358/171 |
| 5,083,204 | 1/1992 | Heard et al. | 358/113 |

FOREIGN PATENT DOCUMENTS

| 0138579 | 4/1985 | European Pat. Off. | H04N 5/33 |
| 0191170 | 8/1986 | Japan | H04N 5/16 |

Primary Examiner—James J. Groody
Assistant Examiner—Jeffrey S. Murrell
Attorney, Agent, or Firm—L. A. Alkov; W. K. Denson-Low

[57] ABSTRACT

Systems for improving the quality of video images generated by a forward-looking infrared detector array include mechanisms for dynamically adjusting the output signals from one or more non-linear detectors in such an array. These systems and methods utilize the output signals from two or more detectors adjacent to each non-linear detector to provide accurate DC restoration to the signals from such non-linear detectors.

16 Claims, 5 Drawing Sheets

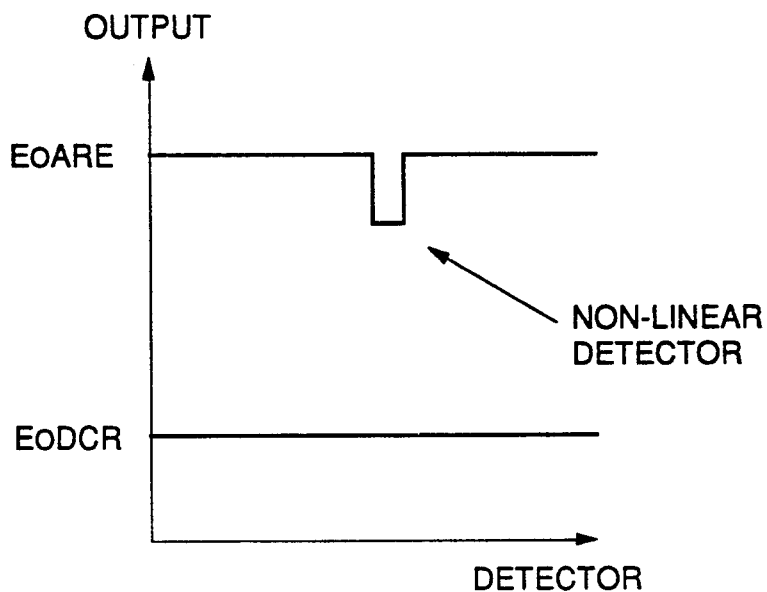
FIG. 1.
(PRIOR ART)
FIG. 2.
(PRIOR ART)
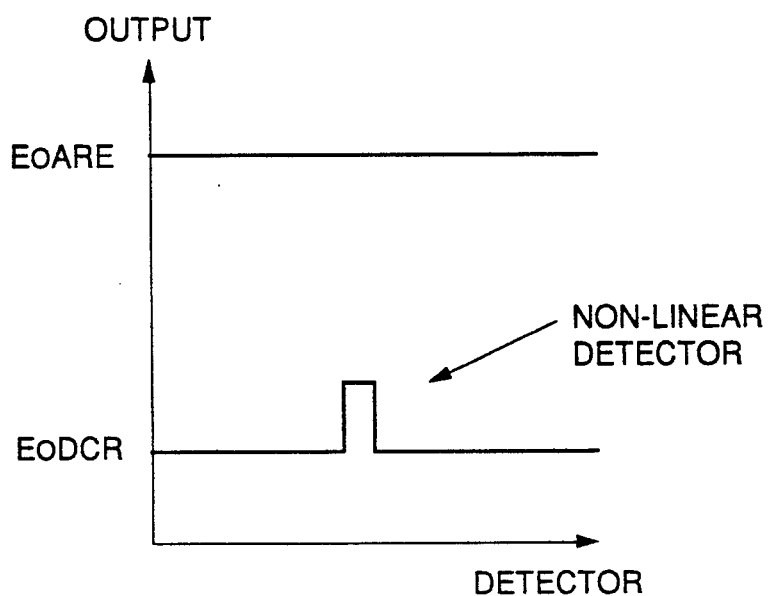

(NORMAL SYSTEM)

PSEUDO CROSS-COUPLE FOR NON-LINEAR DETECTORS

BACKGROUND OF THE INVENTION

1. Field of the Invention

This invention relates to systems and method for improving the quality of video images generated by a forward-looking infrared (FLIR) detector array. These DC-restored systems and methods include means and methods for dynamically adjusting the output signals from one or more non-linear detectors in such arrays.

2. Description of Related Art

Until now, detector arrays that include one or more detectors that have a non-linear transfer function from temperature to output signals have had no capacity for utilizing the good data in these signals, namely the AC portions of the signals.

In the past, non-linear detectors in such array were completely cross-coupled to an adjacent, linear detector. This cross-coupling discarded entirely the good data that such non-linear detectors produced and lowered the vertical MTF (Modulation Transfer Function) in the region that the non-linear detectors scanned, resulting in visible artifacts or defects in the video images based upon signals from these detectors, particularly on diagonal lines in the scene.

A need exists for means and methods for utilizing the AC portion of the output signals from such non-linear detectors while compensating for the imperfect DC portion of these output signals. In this way, the vertical MTF in the region of the non-linear detectors need not be lost.

SUMMARY OF THE INVENTION

This invention relates to image restoration methods and systems called pseudo-cross-coupled systems that include means for DC restoring data from one or more non-linear detectors in an array of such detectors. These systems utilize the output signals from two or more detectors adjacent to each non-linear detector to provide accurate DC restoration to the signals from the non-linear detectors, and utilize the AC portion of the output signals from these same non-linear detectors. These systems, in preferred embodiments, also include means for evaluating data derived from signals produced by a plurality of such detectors, means for determining the appropriate output signal of each detector, and means for generating the desired output signal from each detector.

The methods of this invention include the following steps: evaluating data derived from signals produced by a plurality of detectors; determining the appropriate output of each detector; and generating a desired output signal from each detector. The generating step, in preferred embodiments, includes the steps of: detecting an output signal from one or more non-linear detectors; separating the DC part of the output signals from these non-linear detectors from the AC part of these signals; determining accurate DC restoration values for the output signals from these non-linear detectors from the output signals of two or more detectors adjacent to the non-linear detector; and combining these determined DC restoration values with the AC part of the output signals from the non-linear detectors.

In some preferred embodiments, accurate DC restoration values for the non-linear detectors are derived from the average of the output signals from two or more adjacent detectors. In other preferred embodiments, modified clamp level values for the non-linear detectors are derived from the output signals from the adjacent detectors. Thereafter, DC restoration values are derived from these modified clamp level values in a conventional way.

In preferred embodiments, the output signals are received from an array of forward-looking infrared (FLIR) detectors. The array typically includes 160 vertically-aligned detectors. Each generates an output signal used to produce horizontal lines of a video display as the detector array scans the desired scene. In preferred embodiments, one complete scan by the array includes the scan of a constant temperature source, contained within the FLIR assembly, in addition to the scan of a desired scene. The scan of a constant temperature source provides a uniform stimulus to enable the system to perform DC restoration.

The amplitudes of the analog output signals resulting from the scan of the scene and of the constant temperature source for each detector channel are converted to digital representations and stored in memory devices. An average amplitude is calculated from a desired sampling of the stored data for each detector. In preferred embodiments, separate averages are determined for the desired samplings of data from the scene scan and the constant temperature source scan. The averages calculated for each detector are then used to determine the desired output signals for that particular detector. The computed average of the scene scan sampling is designated $E_OARE_n$ for each channel n, and the computed average of the source scan sampling is designated $E_ODCR_n$ for each channel n. $E_OARE_n$ and $E_ODCR_n$ are averages of a desired number of samples of the scene and source video for each channel.

Once determined, the desired output signal is stored until needed. In preferred embodiments, the signals are stored in memory devices. At desired times, the output signals from each channel are retrieved from memory.

To DC-restore the image data, a desired DC offset signal is calculated for each sensor channel. The DC offset signal is calculated to ensure that the outputs of all the sensors as they scan the uniform temperature source are the same. The digital values of these offset signals are represented by the following:

$$DCR_n(\text{new}) \text{ equals } DCR_n(\text{old}) \text{ plus } k_n(\text{Clamp Level minus } E_ODCR_n) \quad \text{(EQUATION 1)}$$

where $k_n$ is the loop gain constant for the detector, and is chosen to optimize the response of each channel to scene changes. Clamp Level is the system output over the uniform temperature source, is the same for all channels, and is adjusted to optimize system dynamic range.

As EQUATION 1 reflects, each detector has a unique offset voltage called a DCR, added to it before the output signal from the detector is converted from analog to digital form. In the software DC-restored mode, a new value for each DCR is calculated every two scans, i.e. every thirty hertz (30 Hz), by a microprocessor, sometimes called a Signal processor. The DCR value is added to the detector signal to provide a uniform output signal in viewing the uniform temperature source.

When the array includes a non-linear detector, a non-uniform image results. A typical plot of $E_OARE$ and $E_O DCR$ values appears in FIG. 1. In FIG. 1, the $E_O DCR$ values are flat because the system is DC-restored. However, the single non-linear detector in the array has a lower gain, and therefore a lower average output, i.e. $E_O ARE$ value over the scene.

To prevent non-uniformity in the displayed video image derived from the signals from the detector array, an offset voltage is added to the non-linear detector. This offset is calculated to force the output of the non-linear detector to be the same as the average output of the two adjacent detectors. The resulting plot of $E_O ARE$ and $E_O DCR$ values appears in FIG. 2. In preferred embodiments, the required offset can be added as part of the DCR values.

In preferred embodiments, an accurate DCR value for the non-linear detector is computed in accordance with EQUATION 2 or EQUATION 3 below:

$DCR_n$ equals $DCR_n + k_n$ times  EQUATION 2
$((E_O ARE_{n-1}$ plus $E_O DCR_{n+1})/2$ minus $E_O ARE_n)$
Clamp Level$_n$ equals Clamp Level plus  EQUATION 3
$[((E_O ARE_{n-1} - E_O DCR_{n-1})$ plus
$(E_O ARE_{n+1} - E_O DCR_{n+1})]/2$ minus $(E_O ARE_n$ minus $E_O DCR_n))$ EQUATION 2 uses $E_O ARE$ values from two adjacent detectors, preferably the averages of the $E_O ARE$ values from the two detectors most closely adjacent to the non-linear detector, to determine the DCR value for the non-linear detector. EQUATION 3 computes a modified Clamp Level value for the non-linear detector. A new DCR value for the non-linear detector is then computed in accordance with EQUATION 1, using this modified Clamp Level value. EQUATION 3 provides faster correction than EQUATION 2, and is therefore more useful in FLIR systems that scan scenes dynamically, such as airborne FLIR systems.

BRIEF DESCRIPTION OF THE DRAWINGS

This invention can better be understood by reference to the drawings, in which:

FIG. 1 is a graph of $E_O ARE$ and $E_O DCR$ values obtained from an array of detectors in which one of the detectors is non-linear;

FIG. 2 is a graph showing the system output after a DC offset has been added to the output signal of the non-linear detector;

DESCRIPTION OF THE PREFERRED EMBODIMENT

Figure 3:
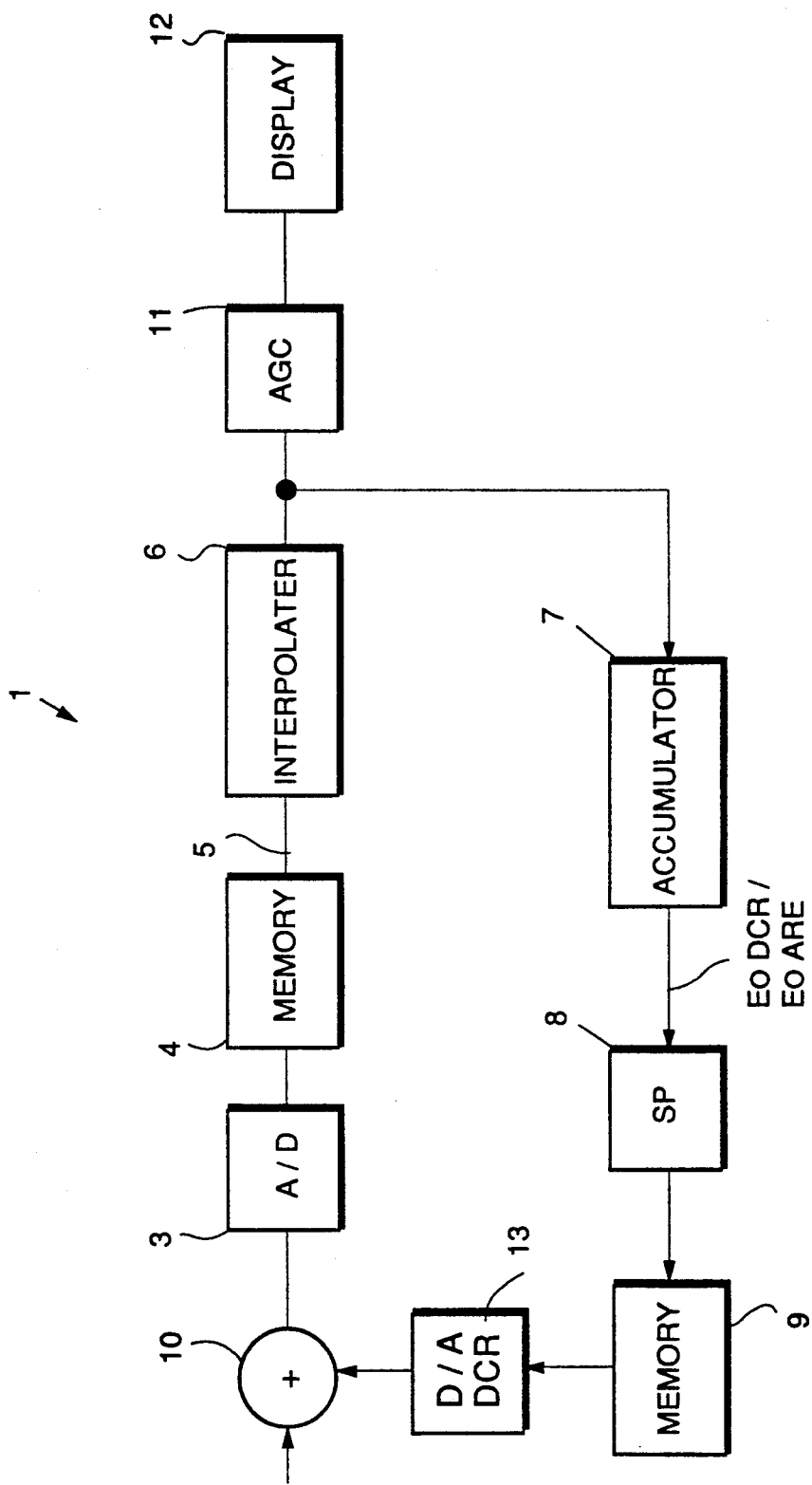
FIG. 3 shows a schematic block diagram illustrating a preferred embodiment of the pseudo cross-coupled, DC-restored image restoration system of this invention.

FIG. 3 shows, in block diagram form, image restoration system 1. The signals received from a forward-looking infrared (FLIR) detector array are time multiplexed, and appear at input 2 of system 1. The amplitudes of these signals are converted from analog to digital form in the A/D converter 3. These digital data are then stored in memory 4, and delivered to interpolator 6 on path 5 as required. System 1 includes interpolator 6 to produce the desired mapping on detector channels to output lines. AGC 11 receives the temperature outputs for the various output lines, and maps them into output gray shades. AGC 11 also adjusts the output gain such that the full range of sensed temperatures is displayed without saturating the display 12. Accumulator 7 receives the outputs of the various detector channels, and calculates the average for each detector channel. These averages are designated $E_O ARE_n$ and $E_O DCR_n$ for each channel n. Microprocessor 8 calculates the DCR values for each detector channel, and stores the values in memory 9. At a desired time, the DCR values are introduced into the system via D to A 13 and adder 10.

The system shown in FIG. 3 includes, in preferred embodiments, 160 parallel channels, each with its own programmable offset. The FLIR image is scanned at 60 Hz for one field, with each channel scanning one horizontal line of the image. To DC restore the image, all 160 channels scan a constant temperature object during part of each field. This constant temperature object is called the source. The image is digitized, scan converted, frame stored, interpolated to 240 lines, converted to analog form, and output to a standard interlaced TV screen.

The microprocessor in the system, denoted SP for signal processor, calculates the offset values to be added to each channel. These offset values are denoted DCR's. An accumulator averages 32 samples of a source video for each channel; these values are called $E_O DCR$'s. The accumulator also averages 128 samples of the scene video for each channel, i.e. every sixth pixel, and these values are called $E_O ARE$'s.

Figure 4:
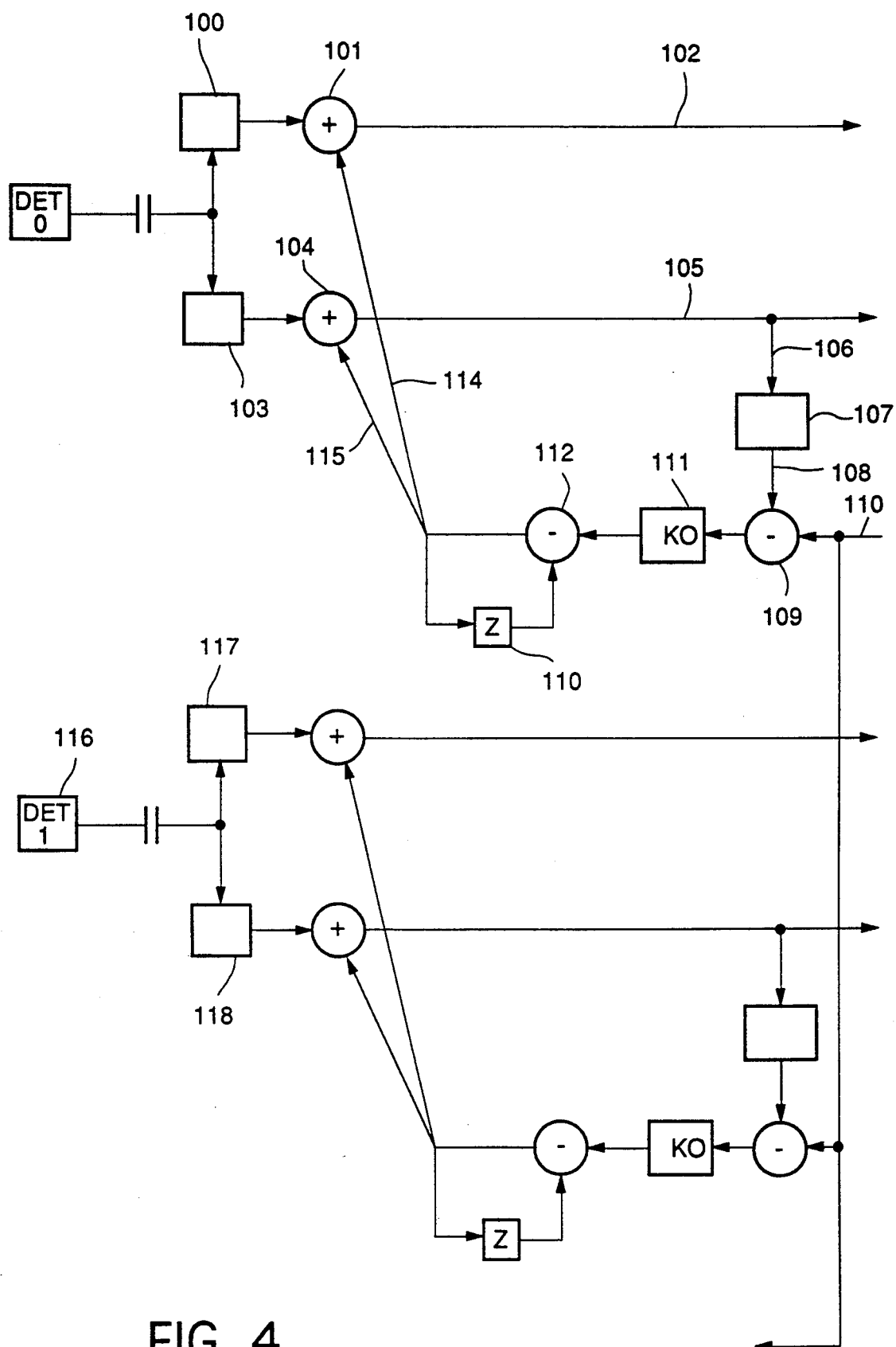
FIG. 4 shows a schematic block diagram illustrating a preferred embodiment of a system for deriving DC restoration values for two detectors in an array of such detectors designed to provide linear output signals.

While FIG. 3 shows a block diagram of the hardware of system 1, the actual logic of the system is in the software of microprocessor 8. FIG. 4 gives a logical block diagram of a conventional DC restoration system implemented by the hardware of FIG. 3, and the software in microprocessor 8. Similarly, FIGS. 5 and 6 show the logical block diagram for a pseudo DC restoration system of EQUATIONS 2 and 3, respectively.

In FIG. 4, the logical block diagram of only 2 detectors, called detector 0 and detector 1, form an array of the kind shown in FIG. 3. However, the remaining detectors in the array are treated similarly. In FIG. 4, each of the detectors 0 and 1 has a linear transfer function. Thus, the output signals from detectors 0 and 1 are DC-restored in accordance with EQUATION 1 above. As FIG. 4 shows, output signals from detector 0 in the sampling of the scene are accumulated and averaged at station 100, combined with a DC restoration signal at station 101, and directed to video display on path 102. Output signals from detector 0 in the sampling of the source are accumulated and averaged at station 103, combined with a DC restoration signal at station 104, and passed on path 105 to computation of a DC restoration value for the next sampling of the scene and source. Signals on path 105 pass via path 106 to averaging station 107, where a plurality of samples are combined and averaged. The average signal, denoted $E_O DCR_0$, passes on path 108 to adder 109. There, and at stations 111 and 112, the signal is combined with the Clamp Level signal on path 110 and the DCR value (stored at station 113) derived from prior sampling of the scene and source, in accordance with EQUATION 1 above. The resulting new DC restoration value passes on paths 114 and 115 to stations 101 and 104 for use in computing the scene and source output data in a succeeding scan. The same DC restoration value computations are done with data derived from scene sampling by detector 1 and stored at station 116, and with data resulting from source sampling by detector 1 and stored at station 118.

Figure 5:
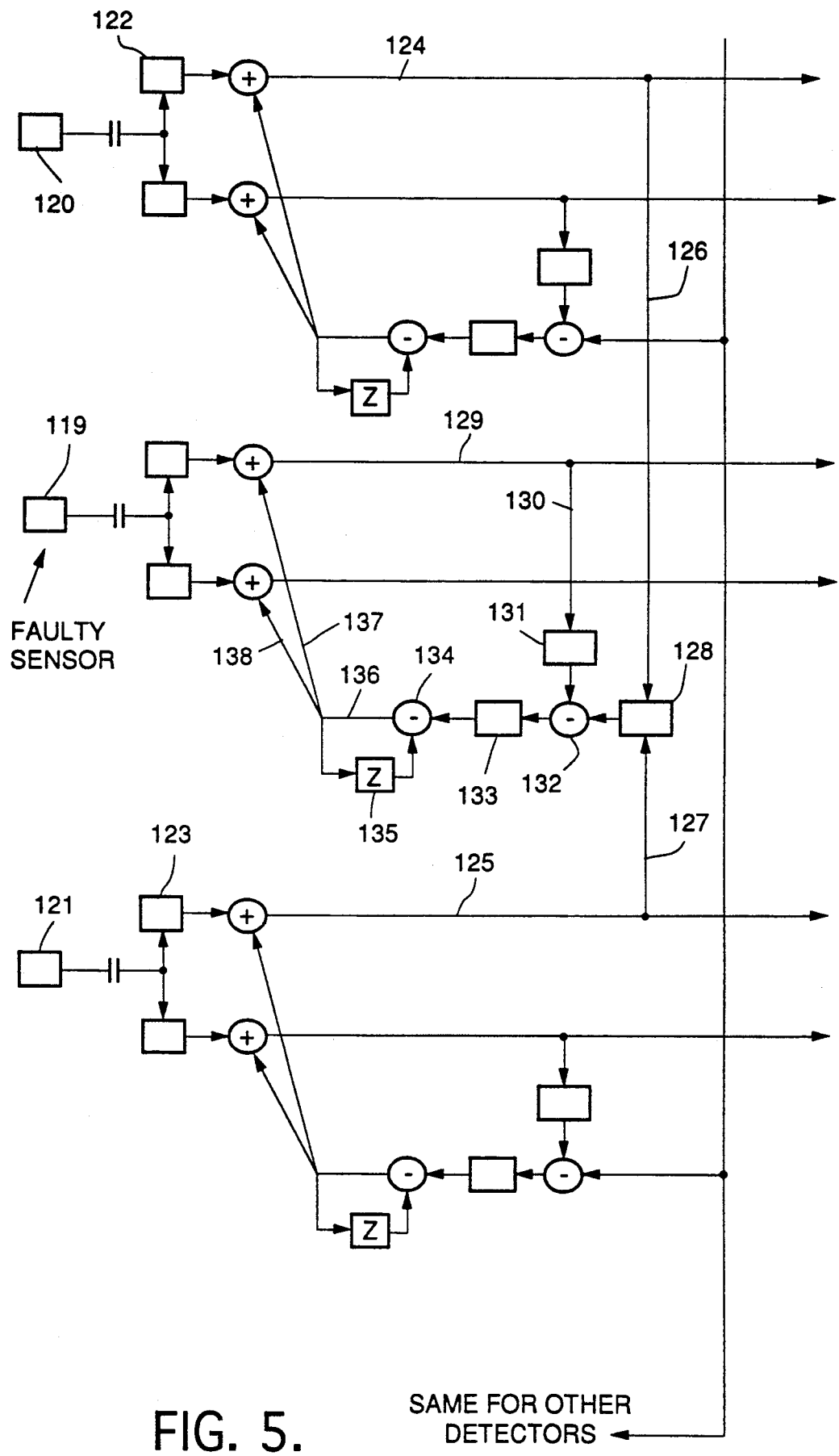
FIG. 5 shows a schematic block diagram illustrating one embodiment of a system for deriving the DC restoration values for a non-linear detector in an array of linear detectors corresponding to the system of EQUATION 2.
Figure 6:
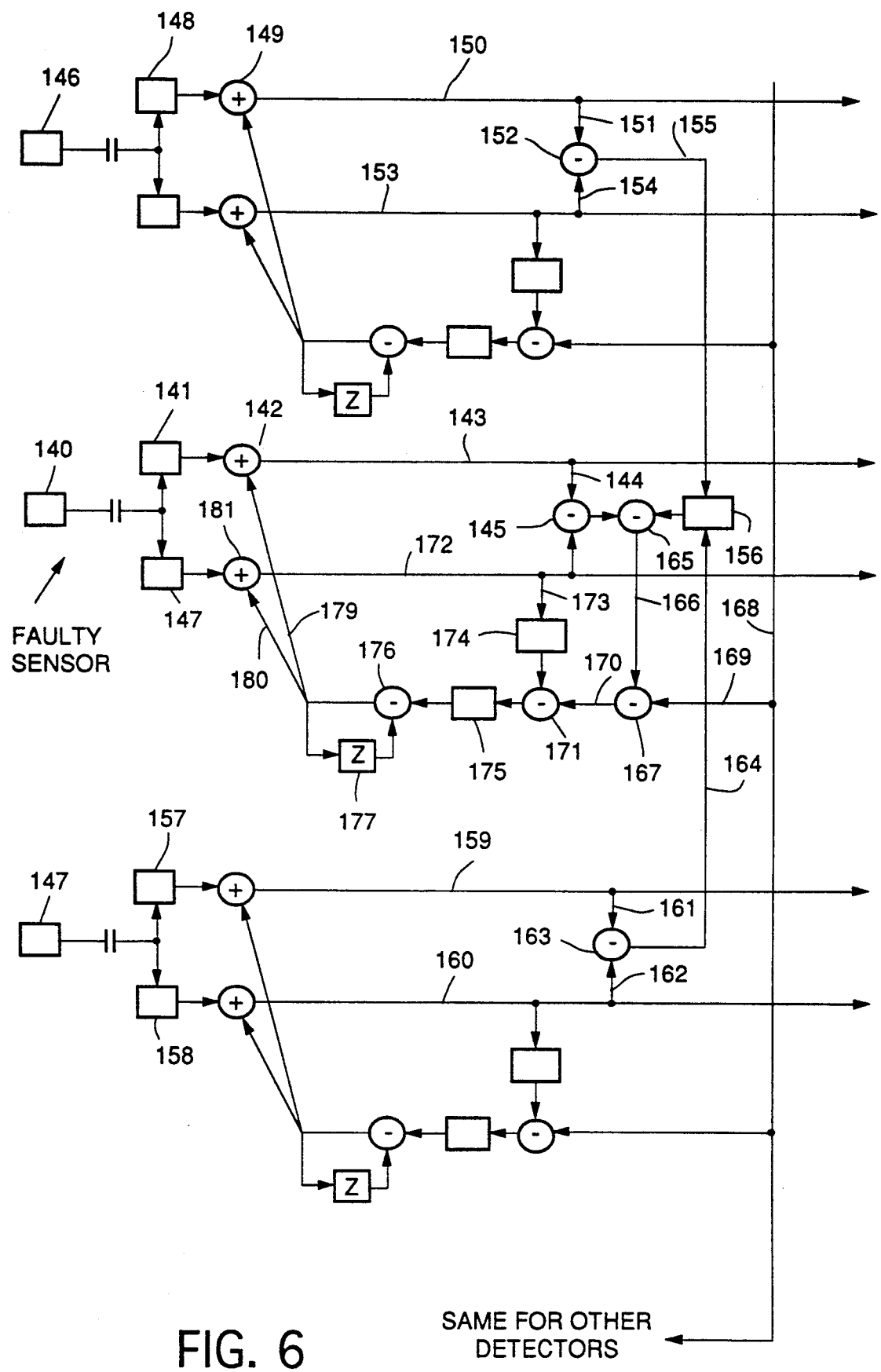
FIG. 6 shows a schematic block diagram illustrating a second embodiment of a system for deriving the DC restoration values for a non-linear detector in an array of linear detectors corresponding to the system of EQUATION 3.

FIG. 5 shows the logical block diagram for the pseudo DC-restoration of a non-linear detector 119 in accordance with EQUATION 2 above. DC-restoration of all other non-linear detectors in the array would use similar schemes, while the DC-restoration of all linear detectors in the array would use the scheme shown in FIG. 4. FIG. 5 also shows the conventional DC-restoration of adjacent linear detectors 120 and 121.

In FIG. 5, the data from non-linear detector 119 is DC-restored in accordance with EQUATION 2 above. To do so, the scene data from adjacent detectors 120 and 121, accumulated at stations 122 and 123, passes on paths 124/125, and 126/127 to averaging station 128. This scene sampling data is then combined with the scene sampling data from sensor 119, which passes on paths 129 and 130 to averaging station 131. These data are then combined at stations 132, 133 and 134 with a DC restoration value from the prior scene and source sampling stored at station 135. The pseudo DC restoration value that results passes on paths 136, 137 and 138 for use in the next cycle of scene and source sampling, in accordance with EQUATION 2.

FIG. 6 shows the logical block diagram for the pseudo DC-restoration of a non-linear detector 140 in accordance with EQUATION 3 above. DC-restoration of all other non-linear detectors in the array would use similar schemes; the DC-restoration of all linear detectors in the array would use the scheme shown in FIG. 4.

FIG. 6 also shows the conventional DC-restoration of adjacent linear detectors 146 and 147. Here, data from non-linear detector 140, is accumulated, in the case of scene sampled data, at station 141, and in the case of source-sampled data, at station 147. The scene-sampled data passes from station 141 to station 142 for combination with the DC restoration value, then on paths 143 and 144 to station 145 where this scene-based information is combined with the scene-based information from linear, adjacent detectors 146 and 147. Scene-based information from detector 146 is accumulated at station 148, combined with a DC restoration value at station 149, and then delivered on paths 150 and 151 to station 152 in combination with source-based data passing to accumulator 152 on paths 153 and 154. The difference between the scene-based data and source-based data from detector 146, passes from station 152 on path 155 to station 156. There, this data is combined with data representing the difference between scene-sampled data accumulated at station 157 and source-based data accumulated at station 158 from linear detector 147. Scene-based data from station 157 and source-based data from station 158 pass on paths 159, 160, 161 and 162 to data combiner 163, and then on path 164 to station 156. Data from station 156 is combined with data from station 145 at station 165 and delivered on path 166 to station 167, together with the Clamp Level signal on paths 168 and 169, to derive a modified Clamp Level signal on path 170 in accordance with EQUATION 3. This modified Clamp Level signal on path 170 is then delivered to combiner 171 together with source-based information from the non-linear detector 140, from station 142 that passes via paths 172 and 173 to averaging station 174. Then, at stations 175 and 176, the modified Clamp Level signal is combined, in accordance with EQUATION 1, with the DC restoration value from the previous cycle, stored at station 177 for delivery on paths 178, 179 and 180 to stations 142 and 181 for use in providing scene output data to video display on path 143.

While preferred embodiments of the present invention have been described and illustrated, other modifications will be apparent to those skilled in the art and it is intended to include all such modifications and variations within the scope of the appended claims.

What is claimed is:

1. An image restoration method comprising the steps of:
    calculating a plurality of restoration signals to be combined with a plurality of output signals, said output signals including desired image data for video display;
    combining said restoration signals with input signals to obtain a plurality of resultant signals; and
    directing said resultant signals to produce a plurality of video images, wherein said directing step includes the steps of (1) detecting an output signal from one or more non-linear detectors; (2) separating the DC part of the output signals from said non-linear detectors from the AC part of said output signals; (3) deriving accurate DC restoration values for the output signal from said non-linear detectors form the output signals of at least two detectors adjacent to each of said non-linear detectors; and (4) combining said AC part of signals with the derived, accurate DC-restoration values.

2. The method of claim 1 in which the step of calculating a plurality of said restoration signals further comprises the steps of:
    extracting data from said output signals;
    calculating a plurality of average values for a plurality of desired samplings of the data extracted from said output signals; and
    relating said average values for each desired sampling for a desired time interval to determine a plurality of restoration signals such that the averages of each resultant signal are substantially equal during a desired time interval.

3. The method of claim 2 in which a forward-looking infrared detector array provides said output signals, wherein said extracting of data includes measuring a plurality of amplitudes of said output signals from said detector array during a scene scan and during a source scan, said scene scan comprising a time period in which said detector array provides output signals of a scan of a scene, and said source scan comprising a time period in which said detector array provides output signals of a scan of a uniform temperature source, and wherein a sampling of said amplitudes are used to calculate said plurality of average values.

4. The method of claim 3 wherein said calculating step for each of said non-linear detectors includes generating the restoration signal for the nth output signal in a closed loop manner by calculating the restoration signal for the next scene scan from the restoration signal used in the current scene scan in accordance with the following equation:

$$DCR_n(\text{new}) \text{ equal } DCR_n(\text{old}) + k_n \text{ times}$$
$$((E_OARE_{n-1} \text{ plus } E_ODCR_{n+1}) / 2 \text{ minus}$$
$$E_OARE_n)$$

where $k_n$ is a constant defined by the system, and chosen to optimize the closed loop response for each input signal; $DCR_n(\text{new})$ is the restoration signal for the nth output signal for the next scene scan; $DCR_n(\text{old})$ is the restoration signal for the nth output signal for the current scene scan; $E_OARE_{n-1}$ is the average of the scene samplings from one of the linear detectors adjacent to said non-linear detectors; $E_OARE_{n+1}$ is the average of the scene samplings from another linear detector adjacent to said non-linear detector; and $E_OARE_n$ $ARE_n$ is the average of the scene samplings from the non-linear detector.

5. The method of claim 3 wherein said calculating step for each of said non-linear detectors for each of said non-linear detectors includes generating the restoration signal for the nth output signal in a closed loop manner by calculating the restoration signal for the next scene scan from the restoration signal used in the current scene scan in accordance with the following equation:

$$\text{Clamp Level}_n(\text{new}) \text{ equals Clamp Level}_n(\text{old}) \text{ plus}$$
$$[((E_OARE_{n-1} - E_ODCR_{n-1}) \text{ plus}$$
$$(E_OARE_{n+1} - E_ODCR_{n+1})]/2 \text{ minus } (E_OARE_n \text{ minus } E_ODCR_n))$$

wherein the value $E_OARE_{n-1}$ is the average of the scene samplings from one of the linear detectors adjacent to said non-linear detector; $E_ODCR_{n-1}$ is the average of the source samplings from one of the linear detectors adjacent to said non-linear detectors; $E_OARE_{n+1}$ and $E_ODCR_{n+1}$ are the averages of the scene and source samplings, respectively, from another of the linear detectors adjacent to said non-linear detector; and $E_OARE_n$ and $E_ODCR_n$ are the averages of the scene and source samplings, respectively, of the samplings from said non-linear detector; and thereafter deriving the restoration signal for the next scan from the restoration signal used in the current scene scan in accordance with the following equation:

$$DCR_n(\text{new}) \text{ equals } DCR_n(\text{old}) \text{ plus } k_n \text{ times (Clamp Level}_n \text{ minus } E_ODCR_n)$$

where $k_n$ is a constant defined by the system, and chosen to optimize the closed loop response for each output signal; $DCR_n(\text{new})$ is the restoration signal for the nth output signal for the next scene scan; $DCR_n(\text{old})$ is the restoration signal for the nth output signal for the current scene scan.

6. The method of claim 2 wherein said calculating step for each of said non-linear detectors includes generating the restoration signal for the nth output signal in a closed loop manner by calculating the restoration signal for the next scene scan from the restoration signal used in the current scene scan in accordance with the following equation:

$$DCR_n(\text{new}) \text{ equals } DCR_n(\text{old}) + k_n \text{ times}$$
$$((E_OARE_{n-1} \text{ plus } E_ODCR_{n-1}) / 2 \text{ minus}$$
$$E_OARE_n)$$

where $k_n$ is a constant defined by the system, and chosen to optimize the closed loop response for each input signal; $DCR_n(\text{new})$ is the restoration signal for the nth output signal for the next scene scan; $DCR_n(\text{old})$ is the restoration signal for the nth output signal for the current scene scan; $E_OARE_{n-1}$ is the average of the scene samplings from one of the linear detectors adjacent to said non-linear detectors; $E_OARE_{n+1}$ is the average of the scene samplings from another linear detector adjacent to said non-linear detector; and $E_OARE_n$ is the average of the scene samplings from the non-linear detector.

7. The method of claim 2 wherein said calculating step for each of said non-linear detectors for each of said non-linear detectors includes generating the restoration signal for the nth output signal in a closed loop manner by calculating the restoration signal for the next scene scan from the restoration signal sued in the current scene scan in accordance with the following equation:

$$\text{Clamp Level}_n(\text{new}) \text{ equals Clamp Level}_n(\text{old}) \text{ plus}$$
$$[((E_OARE_{n-1} - E_ODCR_{n-1}) \text{ plus}$$
$$(E_OARE_{n+1} - E_ODCR_{n+1})]/2 \text{ minus } (E_OARE_n \text{ minus } E_ODCR_n))$$

wherein the value $E_OARE_{n-1}$ is the average of the scene samplings from one of the linear detectors adjacent to said non-linear detector; $E_ODCR_{n-1}$ is the average of the source samplings from one of the linear detectors adjacent to said non-linear detectors; $E_OARE_{n+1}$ and $E_ODCR_{n+1}$ are the averages of the scene and source samplings, respectively, from another of the linear detectors adjacent to said non-linear detector; and $E_OARE_n$ and $E_ODCR_n$ are the averages of the scene and source samplings, respectively, of the output signal from said non-linear detector; and thereafter deriving the restoration signal for the next scan from the restoration signal used in the current scene scan in accordance with the following equation:

$$DCR_n(\text{new}) \text{ equals } DCR_n(\text{old}) \text{ plus } k_n \text{ times (Clamp level}_n \text{ minus } E_ODCR_n)$$

where $k_n$ is a constant defined by the system, and chosen to optimize the closed loop response for each output signal; $DCR_n(\text{new})$ is the restoration signal for the nth output signal for the next scene scan; and $DCR_n(\text{old})$ is the restoration signal for the nth output signal for the current scene scan.

8. The method of claim 1 wherein said calculating step for each of said non-linear detectors includes generating the restoration signal for the nth output signal in a closed loop manner by calculating the restoration signal for the next scene scan from the restoration signal used in the current scene scan in accordance with the following equation:

$$DCR_n(\text{new}) \text{ equals } DCR_n(\text{old}) + k_n \text{ times}$$
$$((E_OARE_{n-1} \text{ plus } E_ODCR_{n+1}) / 2 \text{ minus}$$
$$E_OARE_n)$$

where $k_n$ is a constant defined by the system, and chosen to optimize the closed loop response for each output signal; $DCR_n(\text{new})$ is the restoration signal for the nth output signal for the next scene scan; $DCR_n(\text{old})$ is the restoration signal for the nth output signal for the current scene scan; $E_OARE_{n-1}$ is the average of the scene samplings from one of the linear detectors adjacent to said non-linear detectors; $E_OARE_{n+1}$ is the average of the scene samplings from another linear detector adjacent to said non-linear detector; and $E_OARE_n$ is the average of the scene samplings from the non-linear detector.

9. The method of claim 1 wherein said calculating step for each of said non-linear detectors includes generating the restoration signal for the nth output signal in a closed loop manner by calculating the restoration signal for the next scene scan from the restoration signal used in the current scene scan in accordance with the following equation:

Clamp Level$_n$ (new) equals Clamp Level$_n$ (old) plus
$$[((E_OARE_{n-1} - E_ODCR_{n-1}) \text{ plus}$$
$$(E_OARE_{n+1} - E_ODCR_{n+1})]/2 \text{ minus } (E_OARE_n \text{ minus } E_ODCR_n))$$

wherein the value $E_OARE_{n-1}$ is the average of the scene samplings from one of the linear detectors adjacent to said non-linear detector; $E_ODCR_{n-1}$ is the average of the source samplings from one of the linear detectors adjacent to said non-linear detectors; $E_ODCR_{n+1}$ and $E_ODCR_{n+1}$ are the averages of the scene and source samplings, respectively, from another of the linear detectors adjacent to said non-linear detector; and $E_OARE_n$ and $E_ODCR_n$ are the averages of the scene and source samplings, respectively, from said non-linear detector; and thereafter deriving the restoration signal for the next scan from the restoration signal used in the current scene scan in accordance with the following equation:

$$DCR_n \text{ (new) equals } DCR_n \text{ (old) plus } k_n \text{ times (Clamp Level}_n \text{ minus } E_ODCR_n)$$

where $k_n$ is a constant defined by the system, and chosen to optimize the closed loop response for each output signal; $DCR_n$(new) is the restoration signal for the nth output signal for the next scene scan; and $DCR_n$(old) is the restoration signal for the nth output signal for the current scene scan.

10. An image restoration system comprising a plurality of signal detectors;
means for determining the appropriate signal output from each of said detectors;
means for generating the desired output signals from each of said detectors;
said generating means including means for calculating a plurality of restoration signal to be combined with a plurality of output signals, said output signals including the desired image data for a video display;
means for combining the resotration signals with said output signals to obtain a plurality of resultant signals; and
means for directing the resultant signals to produce a plurality of video images, wherein said directing means includes (1) means for detecting an output signal form one or more non-linear detectors; (2) means for separating the DC part off the output signals from said non-linear detectors from the AC part of said output signals; (3) means for deriving accurate DC restoration values for the output signals from said non-linear signals from the output signals of at least two linear detectors adjacent to each of said non-linear detectors; and (4) means for combining said AC part of said signals from said non-linear detectors with the desired accurate DC restoration values for said output signals from said non-linear detectors.

11. The system of claim 10 further comprising:
means for extracting data from said output signals;
means for calculating a plurality of average values for a plurality of desired samplings of the data extracted from said output signals; and
means for relating the average values for each desired sampling for a desired time interval to determine a plurality of restoration signals such that the averages of each resultant signal are substantially equal during a desired time interval.

12. The system of claim 10 further comprising:
a forward-looking infrared detector array that includes said detectors.

13. The system of claim 12 wherein said means for calculating includes means for generating the restoration signal for the nth output signal from each of said non-linear detectors in a closed loop manner by calculating the restoration signal for the next scene scan from the restoration signal used in the current scene scan in accordance with the following equation:

$$DCR_n(\text{new}) \text{ equals } DCR_n(\text{old}) + k_n \text{ times}$$
$$((E_OARE_{n-1} \text{ plus } E_ODCR_{n+1}) / 2 \text{ minus } E_OARE_n)$$

where $k_n$ is a constant defined by the system, and chosen to optimize the closed loop response for each output signal; $DCR_n$(new) is the restoration signal for the nth output signal for the next scene scan; $DCR_n$(old) is the restoration signal for the nth output signal for the current scene scan; $E_OARE_{n-1}$ is the average of the scene samplings from one of the linear detectors adjacent to said non-linear detectors; $E_OARE_{n+1}$ is the average of the scene samplings from another detector adjacent to said non-linear detector; and $E_OARE_n$ is the average of the scene samplings from the non-linear detector.

14. The system of claim 12 wherein said means for calculating includes means for generating the restoration signal for the nth output signal in a closed loop manner by calculating the restoration signal for the next scene scan from the restoration signal used in the current scene scan in accordance with the following equation:

Clamp Level$_n$ (new) equals Clamp Level$_n$ (old) plus
$$[((E_OARE_{n-1} - E_ODCR_{n-1}) \text{ plus}$$
$$(E_OARE_{n+1} - E_ODCR_{n+1})]/2 \text{ minus } (E_OARE_n \text{ minus } E_ODCR_n))$$

wherein the value $E_OARE_{n-1}$ is the average of the scene samplings from one of the linear detectors adjacent to said non-linear detector; $E_ODCR_{n-1}$ is the average of the scene samplings from one of the linear detectors adjacent to said non-linear detector; $E_ODCR_{n-1}$ is the average of the source samplings from one of the linear detectors adjacent to said non-linear detectors; $E_OARE_{n+1}$ and $E_ODCR_{n+1}$ are the averages of the scene and source samplings, respectively, from another of the linear detectors adjacent to said non-linear detector; and $E_OARE_n$ and $E_ODCR_n$ are the averages of the scene and source samplings, respectively, from said non-linear detector; and thereafter deriving the restoration signal for the next scan from the restoration signal used in the current scene scan in accordance with the following equation:

$$DCR_n \text{ (new) equals } DCR_n \text{ (old) plus } k_n \text{ times (Clamp Level}_n \text{ minus } E_ODCR_n)$$

where $k_n$ is a constant defied by the system, and chosen to optimize the closed loop response for each output signal; $DCR_n$(new) is the restoration signal for the nth output signal for the next scene scan; $DCR_n$(old) is the restoration signal for the nth output signal for the current scene scan.

15. The system of claim 10 wherein said means for calculating includes means for generating the restoration signal for the nth output signal from each of said non-linear detectors in a closed loop manner by calculating the restoration signal for the next scene scan from the restoration signal used in the current scene scan in accordance with the following equation:

$$DCR_n(\text{new}) \text{ equals } DCR_n(\text{old}) + k_n \text{ times} \\ ((E_OARE_{n-1} \text{ plus } E_ODCR_{n+1}) / 2 \text{ minus} \\ E_OARE_n)$$

where $k_n$ is a constant defined by the system, and chosen to optimize the closed loop response for each output signal; $DCR_n(\text{new})$ is the restoration signal for the nth output signal for the next scene scan; $DCR_n(\text{old})$ is the restoration signal for the nth output signal for the current scene scan; $E_OARE_{n-1}$ is the average of the scene samplings from one of the linear detectors adjacent to said non-linear detectors; $E_OARE_{n+1}$ is the average of the scene samplings from another detector adjacent to said non-linear detector; and $E_OARE_n$ is the average of the scene samplings from the non-linear detector.

16. The system of claim 10 wherein said means for calculating includes means for generating the restoration signal for the nth output signal in a closed loop manner by calculating the restoration signal for the next scene scan from the restoration signal used in the current scene scan in accordance with the following equation:

$$\text{Clamp Level}_n (\text{new}) \text{ equals Clamp Level}_n (\text{old}) \text{ plus} \\ [((E_OARE_{n-1} - E_ODCR_{n-1}) \text{ plus} \\ (E_OARE_{n+1} - E_ODCR_{n+1})]/2 \text{ minus } (E_OARE_n \text{ minus } E_ODCR_n))$$

wherein the value $E_OARE_{n-1}$ is the average of the scene samplings from one of the linear detectors adjacent to said non-linear detector; $E_ODCR_{n-1}$ is the average of the source samplings from one of the linear detector adjacent to said non-linear detectors $E_OARE_{n-1}$ and $E_ODCR_{n+1}$ are the averages of the scene and source samplings, respectively, from another of the linear detectors adjacent to said non-linear detector; and $E_OARE_n$ and $E_ODCR_n$ are the averages of the scene and source samplings, respectively, from said non-linear detector; and thereafter deriving the restoration signal for the next scan from the restoration signal use din the current scene scan in accordance with the following equation:

$$DCR_n (\text{new}) \text{ equals } DCR_n (\text{old}) \text{ plus } k_n \text{ times (Clamp level}_n \text{ minus } E_ODCR_n)$$

where $k_n$ is a constant defined by the system, and chosen to optimize the closed loop response for each output signal; $DCR_n(\text{new})$ is the restoration signal for the nth output signal for the next scene scan; $DCR_n(\text{old})$ is the restoration signal for the nth output signal for the current scene scan.

* * * * *